United States Patent [19]

Anderson

[11] 4,148,278
[45] Apr. 10, 1979

[54] SELF FEEDING BUNK OR BARRIER

[75] Inventor: Joseph A. Anderson, Jamestown, N. Dak.

[73] Assignee: Haybuster Manufacturing, Inc., Jamestown, N. Dak.

[21] Appl. No.: 845,316

[22] Filed: Oct. 25, 1977

[51] Int. Cl.² ............................................. A01K 5/00
[52] U.S. Cl. ................................................... 119/60
[58] Field of Search ................................... 119/58–61, 119/51 R

[56] References Cited

U.S. PATENT DOCUMENTS

| | | | |
|---|---|---|---|
| 2,813,509 | 11/1957 | Bruno | 119/61 |
| 3,030,920 | 4/1962 | Hibbert | 119/60 |
| 3,782,333 | 1/1974 | Feterl | 119/58 |
| 4,009,687 | 3/1977 | Korthals | 119/60 |

Primary Examiner—Jay N. Eskovitz
Attorney, Agent, or Firm—Nickolas E. Westman

[57] ABSTRACT

A self feeding bunk or barrier used for permitting cattle to eat directly from stacks of forage such as hay, and which comprises a modular member having an upright, slat barrier through which the animals can feed from a forage stack that the sections surround. The barrier modules include a horizontal support deck attached to the upright barrier and held by end frames. The horizontal floor or deck is of sufficient lateral width (outwardly from the stack) so that the animal which is feeding cannot reach through the upright barrier for eating unless it is standing on the deck. The barrier module is securely held by the animal itself as it eats so that the barrier cannot be dislodged.

4 Claims, 3 Drawing Figures

SELF FEEDING BUNK OR BARRIER

BACKGROUND OF THE INVENTION

1. Field of the Invention

The present invention relates to self feeding bunk sections used for permitting animals to feed from stacks of forage.

2. Prior Art

It has been long known to place a length of barbed wire or similar fencing type materials around a stack of forage and permit the cattle to feed from the forage stack directly from the outside of the fence. Additionally, slatted gates have been utilized to surround a forage stack to permit the cattle to feed through such stacks.

The problem of course is that animals feeding from a stack are always interested in getting closer to the stack and they scatter the forage and damage or even completely destroy the forage by stamping it into the ground so that much of it is lost and wasted.

SUMMARY OF THE INVENTION

A type of barrier or feed bunk for use with stacks of forage, in particular for self feeding and which includes an open work upright barrier wall through which animals can feed, and which has a horizontal deck or support extending from the upright barrier wall so that the animal has to place its front feet on the deck before it can eat from the forage stack on the opposite side of the upright wall.

The unit is made into individual modules or sections of a desired length, which sections are self contained and can be fastened together end to end and at angular relationship in any desired manner to surround a forage stack, or which sections can be merely left to stand alone adjacent the forage stack. When the animal places its feet on the outwardly extending deck, it is impossible for the animal to then move or dislodge the barrier or bunk and cause scattering of the forage and thus wasting of the forage.

The lateral width of the deck which extends outwardly from the upright barrier wall is selected to be of sufficient width to prevent any substantial extension of the head of the animal through the upright barrier wall without stepping on the deck.

DESCRIPTION OF THE PREFERRED EMBODIMENT

Figure 1:
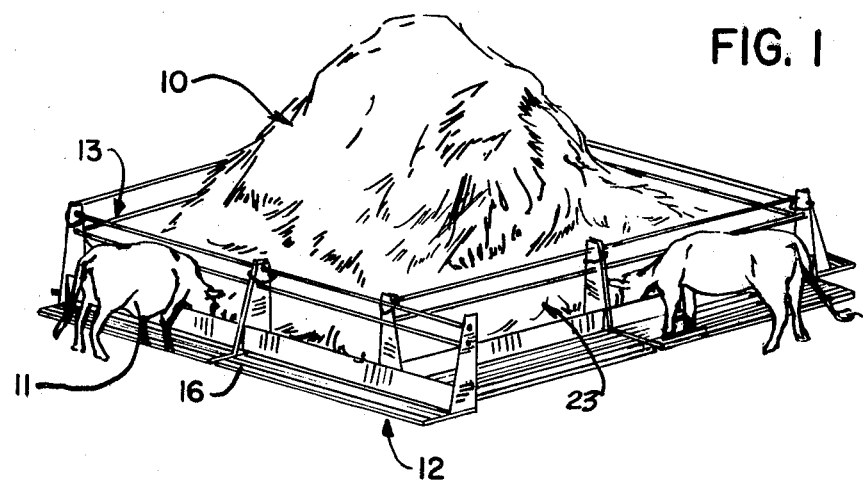
FIG. 1 is a schematic perspective view of a forage stack surrounded by barriers or bunks made according to the present invention.

In FIG. 1, a stack of forage indicated generally at 10, can be any type of desired forage material, such as hay or the like, which is used for self feeding of cattle or horses, for example for feeding steers or cows indicated at 11. In order to prevent the forage from being scattered, it has been known that a type of barrier should be provided so that the cows can only eat through the barrier and not be in a position to stamp and scatter the forage stack as they eat.

The present invention comprises the use of a portable barrier or bunk section or module indicated generally at 12 which can be placed together with a number of bunk sections to surround the forage stack as desired, and which barrier sections 12 can be placed end to end and held together with suitable chains, or even wire, or other types of fasteners. At the junction corners, as indicated generally at 13, the barrier sections 12 can be wired or chained together to hold them in an assembly around the forage stack 10.

Figure 2:
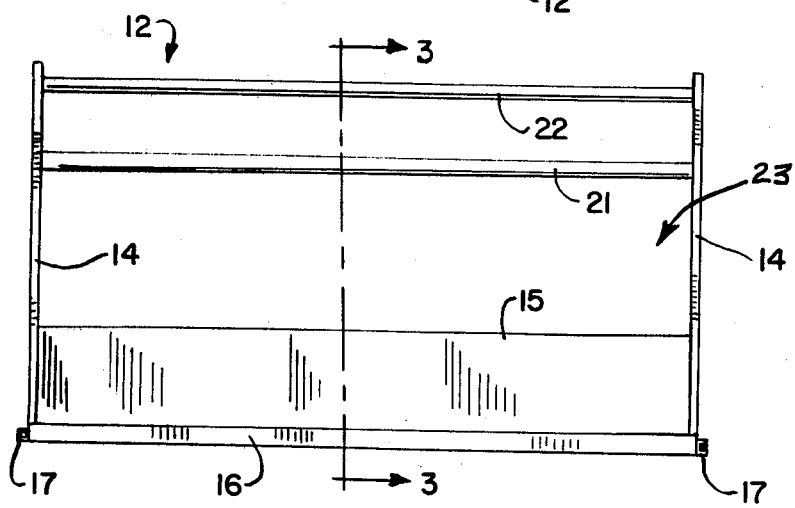
FIG. 2 is a front view of a typical barrier or bunk section as viewed from the direction in which an animal would stand in looking toward the forage stack.
Figure 3:
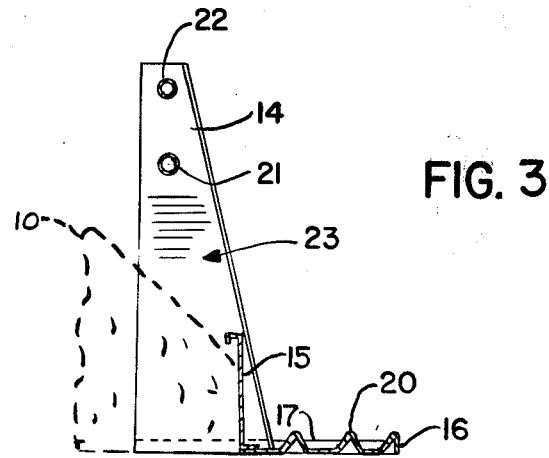
FIG. 3 is a sectional view taken as on line 3—3 in FIG. 2.

The bunk or barrier section 12 is shown more particularly in FIGS. 2 and 3. Each of the barrier sections includes a pair of upright end frame members 14, which are spaced apart, and which are held together at their lower portions by an upright wall 15 that is welded (or otherwise secured) to the end frame members 14,14 in any desired manner. Further, a generally horizontal deck or support platform 16 is welded (or fastened) to the wall 15, and to outwardly extending horizontal lower support members 17, welded to end frames 14. The deck 16 extends outwardly from the wall 15 a desired amount. The end support members 17 join the deck 16 to the upright frame members 14 in a secure manner, and as can be seen the deck 16 includes strengthening ribs or irregularities extending along the length of the deck indicated generally at 20 to give it greater strength. It is of course apparent that additional supports 17 could be placed underneath the deck 16 if desired, and that the deck 16 can be reinforced in any desired manner.

The wall 15 extends upwardly from the deck 16 a short distance, for example approximately a foot or so, and the upper portions of the side frame members 14 are held together with a pair of spaced slats 21 and 22, secured thereto which can be tubular or any other desired cross sectional shape, which would serve to reinforce the barrier sections and provide openings for foraging, and yet preventing the animals from climbing through the barrier to get at the forage stack 10.

In feeding, as can be seen in FIG. 1, the barrier sections 12 are placed adjacent to the forage stack 10, and the cattle 11 must step on the deck 16 in order to extend their heads through the open spaces between the upper edge of wall 15 and the lower slat 21 or between the slats. This space is indicated generally at 23 in FIG. 3. The lateral width of deck or horizontal support 16 is selected so that the front feet of the animal as shown in FIG. 1 must be placed on the deck when it is eating. This securely anchors the barrier 12, and prevents the animal from pushing the barrier, and moving it or tipping it over. Therefore, the barrier module provides a secure and stable bunk type feeder.

It should be noted that the upright wall 15 prevents forage from being pulled out by the animal onto the deck 16 and out onto the ground where it would be wasted. The space 23 provides adequate space for feeding of forage held or retained by wall 15. Of course the animals can also feed between the slats and over the top of the bunk or barrier above slat 22.

The deck 16 extends laterally outwardly a sufficient distance, for example 18 inches or so, from the retaining wall 15 to insure that the animal cannot push the bunk out of the way, tip it over, or get at the forage sufficiently to disrupt the bunk without standing on the platform 16. The wall 15 does not have to be solid, but should be of material that retains the forage.

The operative width of deck 16 can be adjusted for the type of animal being fed, but it is easily selectable to insure that the front legs of the animal must be placed on the deck 16 before the head can be placed through the opening 23 or across the barrier pipes 21 or 22.

The upright wall 15 insures that the forage will not spill out, and thus provides feed bunk operation for the barrier walls in a convenient and simple manner. The devices are low cost and easily used, and are readily portable, but yet prevent the animals from moving them during the feeding operation.

What is claimed is:

1. A portable feeding device for use in self feeding of forage by animals from a forage stack adjacent which the barrier is placed including a frame comprising laterally spaced end frame members, means extending between said end frame members to form an upright barrier to prevent animals from passing through the space between said end frame members but having spaces to permit the head and neck of an animal to extend therethrough for feeding from said forage stack, and an animal supporting deck extending between and fixed to said end frame members, said deck extending generally horizontally outwardly from said barrier for substantially the entire length between said end members in a direction opposite from said forage stack, and said deck extending sufficiently from the barrier wall to prevent an animal eating forage from the forage stack from extending its head substantially beyond the upright barrier without placing its front feet on said deck.

2. The combination as specified in claim 1 wherein the said upright barrier comprises a panel which retains forage from passing therethrough extending between said upright frame members and also from a level adjacent said deck upwardly a desired amount.

3. The combination as specified in claim 2 wherein said barrier includes at least one transverse cross slat that is positioned above said panel a desired distance.

4. The combination of claim 1 wherein said end frame members comprise panels extending laterally from the upright panel in opposite direction than the extension of said deck and said slat member being attached to said end panels on an opposite side from said deck of a generally upright plane extending along said upright panel.

* * * * *